US008266308B2

(12) United States Patent
Rydberg et al.

(10) Patent No.: US 8,266,308 B2
(45) Date of Patent: Sep. 11, 2012

(54) SYSTEM, METHOD, AND DEVICE FOR COMMUNICATING BETWEEN A FIELD DEVICE, DEVICE CONTROLLER, AND ENTERPRISE APPLICATION

(75) Inventors: Kris M. Rydberg, Shoreview, MN (US); Andrew J. Lunstad, Shoreview, MN (US); Herb Berscheid, Maple Grove, MN (US)

(73) Assignee: Comtrol Corporation, Maple Grove, MN (US)

( * ) Notice: Subject to any disclaimer, the term of this patent is extended or adjusted under 35 U.S.C. 154(b) by 651 days.

(21) Appl. No.: 11/709,937

(22) Filed: Feb. 21, 2007

(65) Prior Publication Data
US 2007/0226317 A1 Sep. 27, 2007

Related U.S. Application Data

(60) Provisional application No. 60/775,438, filed on Feb. 21, 2006.

(51) Int. Cl.
G06F 15/16 (2006.01)
G06F 15/173 (2006.01)

(52) U.S. Cl. ......... 709/230; 709/225; 709/229; 709/200

(58) Field of Classification Search .................. 709/230, 709/200, 225, 229; 700/1–89
See application file for complete search history.

(56) References Cited

U.S. PATENT DOCUMENTS

| | | | |
|---|---|---|---|
| 6,067,477 A * | 5/2000 | Wewalaarachchi et al. .... | 700/83 |
| 6,311,220 B1 | 10/2001 | Fischer et al. | |
| 6,556,875 B1 | 4/2003 | Nagasaka et al. | |
| 6,574,681 B1 * | 6/2003 | White et al. .................. | 710/15 |
| 6,640,140 B1 | 10/2003 | Lindner et al. | |
| 6,721,607 B2 | 4/2004 | Brault | |
| 6,812,871 B2 | 11/2004 | Wu | |
| 6,819,960 B1 | 11/2004 | McKelvey et al. | |
| 6,959,356 B2 | 10/2005 | Packwood et al. | |
| 6,973,508 B2 | 12/2005 | Shepard et al. | |
| 6,975,913 B2 | 12/2005 | Kreidler et al. | |
| 8,051,156 B1 * | 11/2011 | Sharma et al. ................ | 709/223 |
| 2003/0155415 A1 | 8/2003 | Markham et al. | |
| 2004/0002950 A1 | 1/2004 | Brennan et al. | |
| 2005/0021839 A1 | 1/2005 | Russell et al. | |
| 2005/0065626 A1 | 3/2005 | Kappelhoff et al. | |
| 2005/0154475 A1 | 7/2005 | Forchert et al. | |
| 2005/0228509 A1 | 10/2005 | James | |
| 2005/0267882 A1 | 12/2005 | Aupperlee et al. | |
| 2006/0009861 A1 | 1/2006 | Bonasia et al. | |

(Continued)

OTHER PUBLICATIONS

Provisional U.S. Appl. No. 60/575,362, filed Jun. 1, 2004.

*Primary Examiner* — Joseph Avellino
*Assistant Examiner* — James Conaway
(74) *Attorney, Agent, or Firm* — Dicke, Billig & Czaja, PLLC

(57) ABSTRACT

A system for communicating between a field device, a device controller for the field device, and an enterprise application distinct from the device controller includes a single communication device configured to communicate with each of the field device, the device controller, and the enterprise application. The single communication device is configured to facilitate communication between the field device and the device controller, and the field device and the enterprise application. The single communication device is configured to replicate data received from the field device and, after replication of the data, separately filter the data for the device controller and the enterprise application.

37 Claims, 5 Drawing Sheets

U.S. PATENT DOCUMENTS

| | | |
|---|---|---|
| 2006/0108411 A1 | 5/2006 | Macurek et al. |
| 2007/0038700 A1* | 2/2007 | Eryurek et al. ............... 709/203 |
| 2007/0067458 A1* | 3/2007 | Chand .......................... 709/226 |
| 2007/0143162 A1* | 6/2007 | Keever et al. ..................... 705/7 |
| 2009/0164031 A1* | 6/2009 | Johnson et al. ................. 700/89 |
| 2011/0153051 A1* | 6/2011 | Bachman et al. ............... 700/96 |

* cited by examiner

SYSTEM, METHOD, AND DEVICE FOR COMMUNICATING BETWEEN A FIELD DEVICE, DEVICE CONTROLLER, AND ENTERPRISE APPLICATION

CROSS-REFERENCE TO RELATED APPLICATIONS

This application claims priority under 35 U.S.C. §119(e) to U.S. Provisional Patent Application Ser. No. 60/775,438, filed on Feb. 21, 2006, and incorporated herein by reference.

This application is related to U.S. Non-Provisional patent application Ser. No. 11/709,938, filed on even date herewith, and incorporated herein by reference.

BACKGROUND

A manufacturing facility may include various measurement and/or control equipment such as sensors, transmitters, and actuators, collectively referred to as field devices, on a plant floor level which are controlled or monitored by one or more control devices (e.g., a programmable logic controller (PLC)). To manage the various field devices, associated controllers and related systems, the manufacturing facility may include enterprise level business planning systems (e.g., enterprise resource planning (ERP)). As such, ERP directs production, at a strategic level, that is handled by the industrial equipment at a tactical level. In addition, information technology (IT) systems, also residing on the enterprise level, may be incorporated throughout the manufacturing facility.

Unfortunately, standard communication protocols of the field devices, associated controllers, enterprise level business planning systems, and IT systems are often different from one another. Thus, communication between the field devices, associated controllers, enterprise level business planning systems, and IT systems is often non-existent. In addition, both IT and the plant floor desire access to the same information sources, but have differing requirements for that information.

Existing solutions either add additional devices or pull all the information from the PLC. Pulling all the information from the PLC, however, requires the PLC to be "shared" between plant engineering and IT, thereby requiring significant cooperation between plant engineering and IT, and limits the information that IT can glean to what the PLC has stored. This method of pulling the information from the PLC, extends the PLC beyond its intended usage in managing operations control.

Accordingly, it is desirable to facilitate communication between a field device, a device controller, and an enterprise application.

SUMMARY

One aspect of the present invention provides a system for communicating between a field device, a device controller, and an enterprise application.

One aspect of the present invention provides a method of communicating between a field device, a device controller, and an enterprise application.

One aspect of the present invention provides a device for communicating between a field device, a device controller, and an enterprise application.

DETAILED DESCRIPTION

In the following detailed description, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
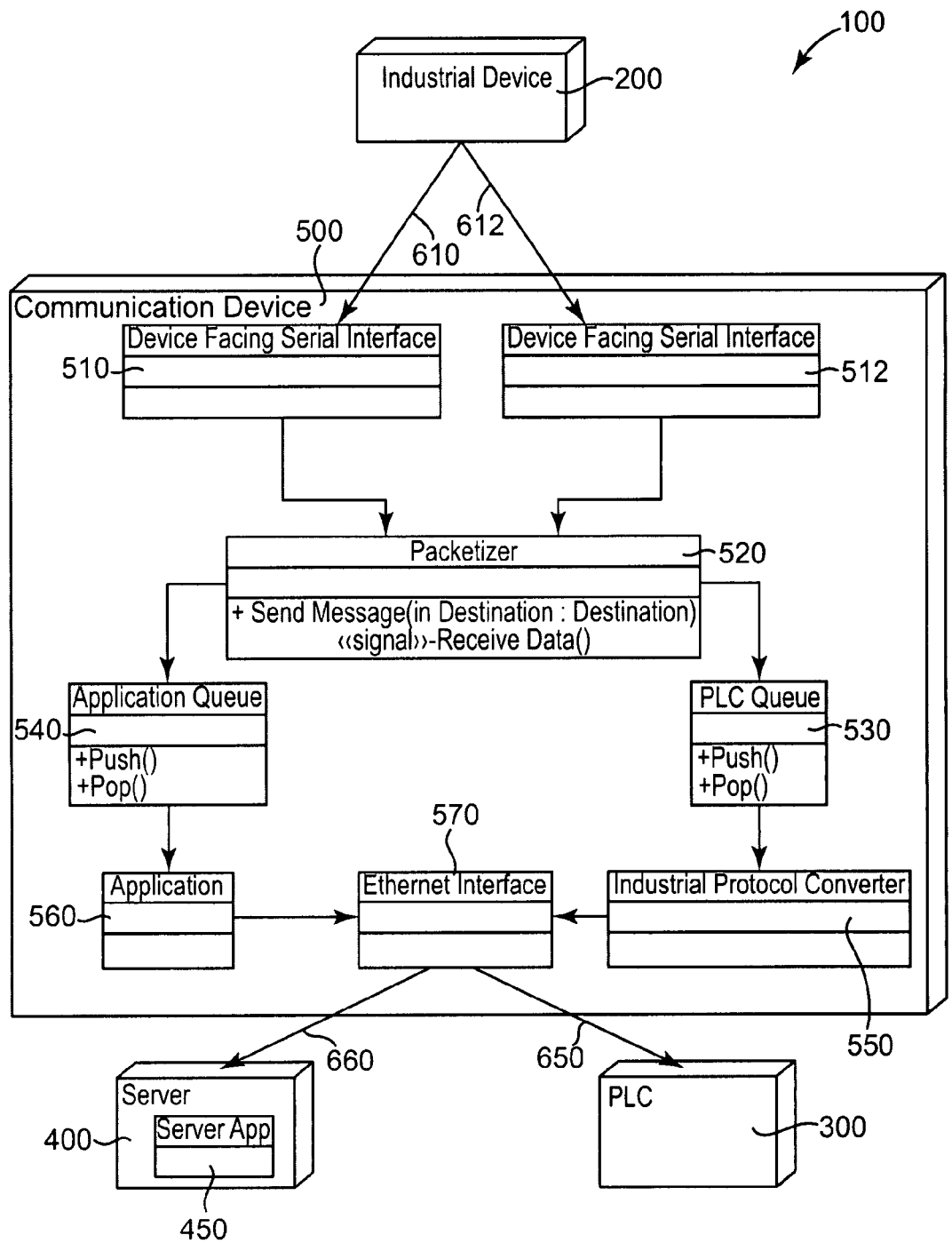
FIG. 1 is a block diagram illustrating one embodiment of a communication system according to the present invention.

FIG. 1 illustrates one embodiment of a communication system 100 according to the present invention. In one embodiment, communication system 100 facilitates communication between a field device, such as industrial device 200, a device controller, such as programmable logic controller (PLC) 300, and an enterprise application residing, for example, on a server 400.

Industrial device 200, as one embodiment of a field device, includes measurement and/or control equipment such as sensors, transmitters, and actuators. Exemplary devices include bar code scanners, weigh scales, radio frequency identification (RFID) readers, vision sensors/photo eyes, lidars, printers, displays, fare machines, and pressure/temperature sensors.

PLC 300, as one embodiment of a device controller, includes a logic device used to control and/or monitor an industrial/field device such as industrial device 200. As such, PLC 300 communicates with one or more industrial/field devices and, typically, implements a control routine or program instructions to provide automated control and/or monitoring functions of the one or more industrial/field devices to accomplish a specific operations or control task.

In one embodiment, server 400 hosts one or more enterprise applications 450. Enterprise application 450 is distinct from PLC 300 and may include, for example, a business application and/or database used by or for management and/or information technology (IT) systems or personnel. Examples of such applications or systems include an enterprise resource planning (ERP) system, a warehouse management system (WMS), a manufacturing execution system (MES), a business intelligence (BI) system, and a customer relationship management (CRM) system. In one embodiment, server 400 is internal to a company at which the operations are being performed and, in another embodiment, server 400 is external to the company (e.g., is a server of a business partner of the company).

As illustrated in the embodiment of FIG. 1, to facilitate control, connectivity, and communication between industrial device 200, PLC 300, and server 400, communication system 100 includes a single control/communication device, such as device 500. In one embodiment, control/communication device 500 (referred to hereinafter as communication device 500) enables data gathered from industrial device 200 to be transparently made available to PLC 300 as well as a non-PLC application, such as enterprise application 450 on server 400. As such, industrial device 200 is "visible" to PLC 300 and server 400 such that ownership (i.e., control or management) of industrial device 200 may reside with PLC 300 and/or server 400. Although only one industrial device 200 is illustrated in FIG. 1, communication device 500 may accommodate multiple connections and additional industrial devices and, as such, dispense data to and/or from the industrial devices as requested.

As described below, communication device 500 provides a platform for control, connectivity, and communication between industrial device 200 (e.g., weigh scale, barcode reader, RFID reader, vision system, sensor, etc.) and both a PLC 300 for industrial device 200 as well as an enterprise application 450 on server 400. As such, communication device 500 replicates received data from industrial device 200 and queues the data for sending to both PLC 300 as well as server 400. Thus, communication device 500 provides for sharing of information from industrial device 200 with both PLC 300 and server 400.

In one embodiment, communication device 500 facilitates communication (e.g., sending of control instructions, commands, configurations, etc.) from both PLC 300 and enterprise application 450 on server 400 to industrial device 200. As such, communication device 500 enables shared control of industrial device 200. More specifically, as described below, communication device 500 enables both PLC 300 and enterprise application 450 on server 400 to control industrial device 200.

Communication device 500, therefore, is provided in a communication path between PLC 300 and industrial device 200, and between enterprise application 450 and PLC 300. Accordingly, as described below, communication device 500 facilitates bidirectional communication between industrial device 200 and PLC 300, and facilitates bidirectional communication between industrial device 200 and enterprise application 450 on server 400. In one embodiment, bidirectional communication between industrial device 200 and PLC 300 is simultaneous with bidirectional communication between industrial device 200 and enterprise application 450 on server 400. In addition, in one embodiment, communication device 500 is provided in a communication path between enterprise application 450 and PLC 300. As such, communication device 500 facilitates communication between enterprise application 450 on server 400 and PLC 300.

In one embodiment, communication device 500 supports and/or includes an operating system (OS), one or more protocol stacks, a web server to allow configuration as well as make configurations and statistics available, and a JVM (Java Virtual Machine). In addition, communication device 500 may support and/or include other servers such as SNMP (Simple Network Management Protocol), Telnet, SSH (Secure Shell), and/or SSL (Secure Sockets Layer). In one exemplary embodiment, communication device 500 provides a software platform that supports Linux, eCos, Sun Java™ ME, or Sun Java™ Systems RFID software.

As illustrated in the embodiment of FIG. 1, communication device 500 includes a device facing serial port or interface 510 and/or a device facing Ethernet port or interface 512. As such, communication device 500 provides for serial and/or Ethernet communications with industrial device 200. In one embodiment, industrial device 200 communicates with communication device 500 over a serial, Ethernet, or Industrial Ethernet protocol. Communication between industrial device 200 and communication device 500 includes communication along an electronic, infrared, optical or other data or wireless data transfer path.

In one embodiment, communication device 500 includes a packetizer 520, a PLC queue 530, and an application queue 540. Packetizer 520 includes a component that receives a byte stream of data from serial interface 510 and/or Ethernet interface 512 and arranges the data in packets. In addition, packetizer 520 replicates the data for sending to both PLC 300 and server 400. As such, packetizer 520 enqueues the packets of data on PLC queue 530 and application queue 540. In one embodiment, PLC queue 530 and application queue 540 each represent a first in first out (FIFO) data structure that allows a decoupling of the processing of items in the queue from the pushing of items onto the queue.

In one embodiment, communication device 500 also includes an industrial protocol converter 550 that converts data from industrial device 200 for communication with PLC 300. As such, PLC queue 530 communicates the data received from industrial device 200 with industrial protocol converter 550. Accordingly, industrial protocol converter 550 converts a format or protocol of data received from industrial device 200 to a format or protocol compatible with PLC 300. A compatible format or protocol includes, for example, formats or protocols native to and/or supported by PLC 300. In one embodiment, the communication protocol is an Ethernet protocol.

In one embodiment, converting data for communication with PLC 300 includes separating the component elements of the data into separate fields. For example, UPC (Uniform Product Code) or EPC (Electronic Product Code) data can be separated into their component Company, Product and other component identifiers. Although only one PLC queue 530 and one industrial protocol converter 550 are illustrated in FIG. 1, communication device 500 may include additional PLC queues and industrial protocols that receive data from packetizer 520.

As illustrated in the embodiment of FIG. 1, communication device 500 also includes an application 560. As such, application queue 540 communicates the data received from industrial device 200 with application 560. In one embodiment, application 560 represents an embedded, distributed application on communication device 500. In one embodiment, application 560 supports, provides, and/or includes a computing platform (e.g., JVM). Examples of application 560 include embedded components of Oracle and SAP. Although only one application queue 540 and one application 560 are illustrated in FIG. 1, communication device 500 may include additional application queues and associated applications that receive data from packetizer 520.

In one embodiment, application 560 represents an embedded application which communicates with and is associated with or is a distributed part, component, or module of enterprise application 450 on server 400. As such, application 560 and enterprise application 450 on server 400 may be part of the same system. As an enterprise application, for example, application 560 may filter and/or analyze data before sending the data to enterprise application 450 on server 400. In one embodiment, application 560 is a manufacturing application and represents an embedded or hosted client application at the floor level. As a manufacturing application, for example, application 560 may analyze information from a number of industrial devices and suggest, for example, a need for maintenance or replacement of parts.

In one embodiment, application 560 converts or translates a format or communication protocol of data from industrial device 200 for communication with enterprise application 450 on server 400. More specifically, application 560 converts a format or protocol of the data to a format or protocol compatible with enterprise application 450. A compatible format or protocol includes, for example, formats or protocols native to and/or supported by enterprise application 450. For example, in one embodiment, an ALE (Application Level Events) stack may provide information to enterprise application 450 on server 400 by formatting RFID data into a protocol that enterprise application 450 can understand.

In one embodiment, communication device 500 provides for filtering of data received from industrial device 200. More specifically, communication device 500 provides for separate or distinct filtering of data received from industrial device 200 for PLC 300 and for enterprise application 450. For example, in one embodiment, data from industrial device 200 is filtered specifically or differently based on the particular needs of PLC 300 and enterprise application 450.

In one embodiment, industrial protocol converter 550 provides for filtering of data for PLC 300, and application 560 provides for filtering of data for enterprise application 450. Accordingly, after replication of data by packetizer 520, industrial protocol converter 550 filters data for PLC 300 and application 560 filters data for enterprise application 450. As such, different types of filtering may be applied to the data for PLC 300 and for enterprise application 450. In one embodiment, for example, application 560 provides for intelligent filtering of data in that data from industrial device 200 is "filtered" with knowledge of the application to which the data is to be applied.

In one embodiment, communication device 500 includes an Ethernet port or interface 570 for communicating with PLC 300 and server 400. As such, in one embodiment, industrial protocol converter 550 and application 560 both communicate with Ethernet interface 570. Ethernet interface 570, therefore, provides an interface for both PLC 300 and enterprise application 450. Accordingly, communication device 500 communicates with IT/enterprise applications on server 400 by using one or more protocols (TCP/IP, HTTP, SNMP, SOAP, etc.).

In one embodiment, in addition to Ethernet interface 570, communication device 500 may also include a serial port (not shown) for communicating with PLC 300. As such, in one embodiment, communication device 500 communicates with PLC 300 over a serial, Ethernet, or Industrial Ethernet protocol. Communication device 500, therefore, may communicate with heterogeneous PLC environments over protocols such as Modbus/TCP, Modbus/RTU, PROFINET, PROFIBUS, and Ethernet/IP. Communication between communication device 500 and PLC 300 and/or server 400 includes communication along an electronic, infrared, optical or other data or wireless data transfer path.

Although only one Ethernet port or interface 570 is illustrated in FIG. 1, communication device 500 may include multiple interfaces providing multiple Ethernet, serial, or other data communication ports. In addition, although only one PLC 300 and one server 400 are illustrated in FIG. 1, communication device 500 may communicate with multiple PLCs and/or multiple servers or multiple enterprise applications. In one embodiment, communication device 500 communicates simultaneously with multiple PLCs and/or multiple enterprise applications. Communication device 500 also facilitates communication with multiple industrial devices independent of the PLC environment or enterprise application.

As represented by the communication paths of arrows 610 and 612, and arrows 650 and 660 in FIG. 1, with communication device 500, PLC 300 and server 400 may both "pull" or read data from industrial device 200. In addition, communication device 500 may "push" information (via events, notifications, commands, instructions, or remote shared data/files) to PLC 300 and/or server 400. As such, PLC 300 and/or enterprise application 450 on server 400 may monitor and/or control or manage industrial device 200. In addition, in one embodiment, PLC 300 and/or server 400 may "push" or submit instructions or commands to industrial device 200 via communication device 500, as described below.

Figure 2:
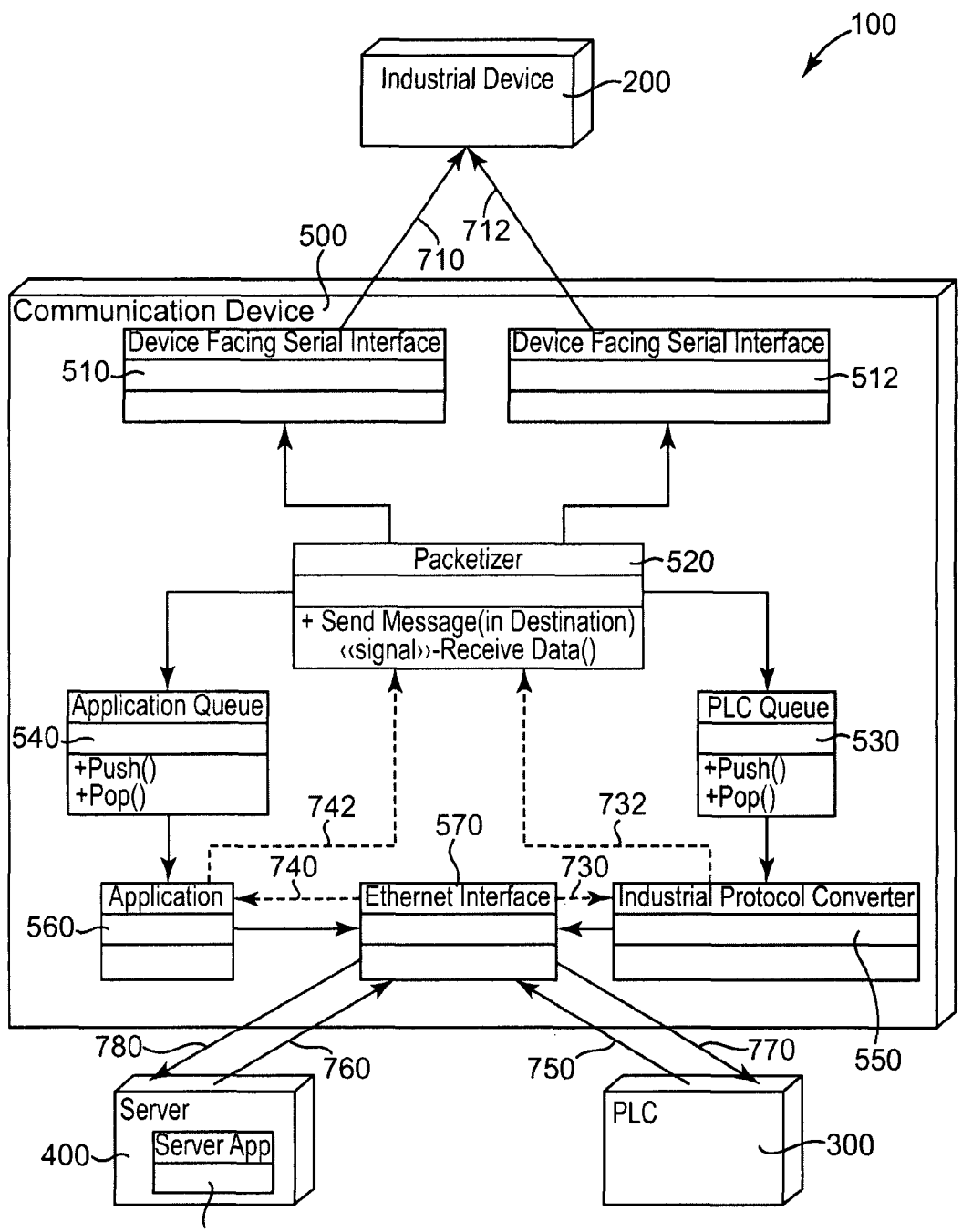
FIG. 2 is a block diagram illustrating one embodiment of a communication system according to the present invention.

As illustrated in the embodiment of FIG. 2, communication system 100 also provides for control or management of industrial device 200 by PLC 300 and/or enterprise application 450 on server 400. For example, as represented by the communication paths of arrows 750 and 760, and arrows 710 and 712, PLC 300 and/or server 400 may submit instructions or commands to industrial device 200 via communication device 500. As such, as illustrated by the communication path of dashed arrows 730 and 732, instructions or commands from PLC 300 are sent to industrial device 200 via industrial protocol converter 550 and packetizer 520. In addition, as illustrated by the communication path of dashed arrows 740 and 742, instructions or commands from enterprise application 450 on server 400 are sent to industrial device 200 via application 560 and packetizer 520.

As illustrated in the embodiment of FIG. 2, and as described below, communication system 100 also enables communication between enterprise application 450 on server 400 and PLC 300. In one embodiment, for example, communication from enterprise application 450 on server 400 to PLC 300 is routed through application 560 and to packetizer 520 along the communication path illustrated by dashed arrows 740 and 742. The communication is then routed to PLC 300 through PLC queue 530 and industrial protocol converter 550, in the manner described above. Accordingly, the communication is routed to PLC 300 from Ethernet interface 570 along the communication path of arrow 770.

In addition, in one embodiment, communication from PLC 300 to server 400 is routed through industrial protocol converter 550 to packetizer 520 along the communication path illustrated by dashed arrows 730 and 732. The communication is then routed to server 400 through application queue 540 and application 560, in the manner described above. Accordingly, the communication is routed to server 400 from Ethernet interface 570 along the communication path of arrow 780.

In one embodiment, in response to data from industrial device 200, application 560 on communication device 500 or enterprise application 450 on server 400 may produce a "business event" to which industrial device 200 is to be controlled with a certain response. As such, occurrence of the business event is communicated to PLC 300 whereby PLC 300 generates a "control event" for specific control of industrial device 200 in response to the business event. An example of a business event includes "What is the current inventory of product A?" and a corresponding control event includes "If the current inventory of product A is less than X, then operate industrial device B and industrial device C to count product A." Another example includes a monitoring application on server 400 being informed of a product D on a conveyor that is not allowed. As such, the application on server 400 may signal to PLC 300 to stop the conveyor or reroute the product.

Figure 3:
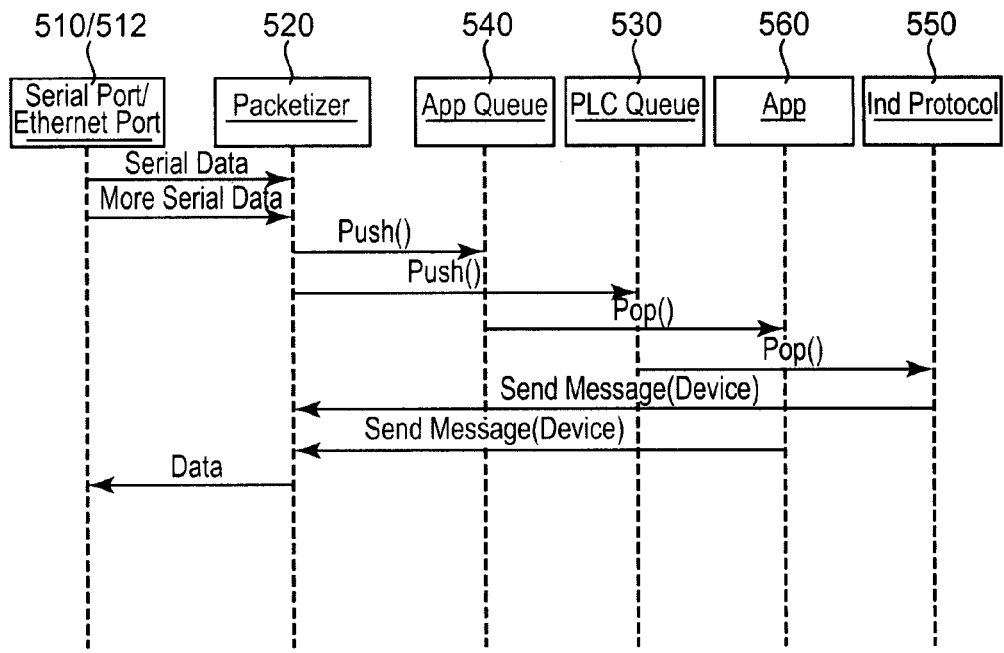
FIG. 3 is a diagram illustrating one embodiment of a process flow in a communication system according to the present invention.

FIG. 3 illustrates one embodiment of a process flow of data in communication system 100. In one embodiment, data of industrial device 200 (FIG. 1) arrives at packetizer 520 from serial interface 510 or Ethernet interface 512. As such, packetizer 520 converts the data into packets and replicates the data for pushing to/placing on PLC queue 530 and application queue 540.

At industrial protocol converter 550 and application 560, industrial protocol converter 550 and application 560 encode or process the data as necessary for sending to PLC 300 (FIG. 1) and the application on server 400 (FIG. 1), respectively. In one embodiment, industrial protocol converter 550 and/or application 560 make a call to PLC queue 530 and/or application queue 540 to request or "pull" data from the respective queue. In response to the call, PLC queue 530 and/or application queue 540 send the data to industrial protocol converter 550 and/or application 560. As such, industrial protocol converter 550 and/or application 560 send the data to PLC 300 (FIG. 1) and/or enterprise application 450 on server 400 (FIG. 1).

In one embodiment, as described above, where industrial device 200 is "owned" or controlled by PLC 300, control messages are sent to industrial device 200 via industrial protocol converter 550 and packetizer 520. As such, data representing the control messages is sent to industrial device 200 via serial interface 510 or Ethernet interface 512. In one embodiment, as described above, where industrial device 200 is controlled by an application on server 400, control messages are sent to industrial device 200 via application 560 and packetizer 520. As such, data representing the control messages is sent to industrial device 200 via serial interface 510 or Ethernet interface 512.

Figure 4:
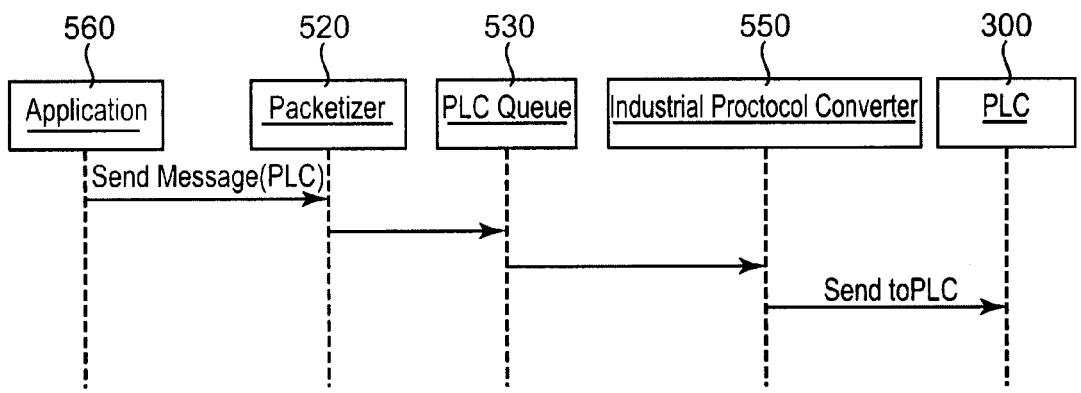
FIG. 4 is a diagram illustrating one embodiment of a process flow in a communication system according to the present invention.

FIG. 4 illustrates one embodiment of a process flow of data in communication system 100, including communication between embedded application 560 of communication device 500 (FIGS. 1 and 2) and PLC 300 (FIGS. 1 and 2). In one embodiment, application 560 sends a communication or message to PLC 300 by specifying PLC 300 as the destination. As such, the message is provided to packetizer 520 and routed to PLC 300 through PLC queue 530 and industrial protocol converter 550 from packetizer 520, in the manner described above. As such, application 560 of communication device 500 may communicate with PLC 300 by providing data to packetizer 520 which in turn provides the data to PLC 300.

Figure 5:
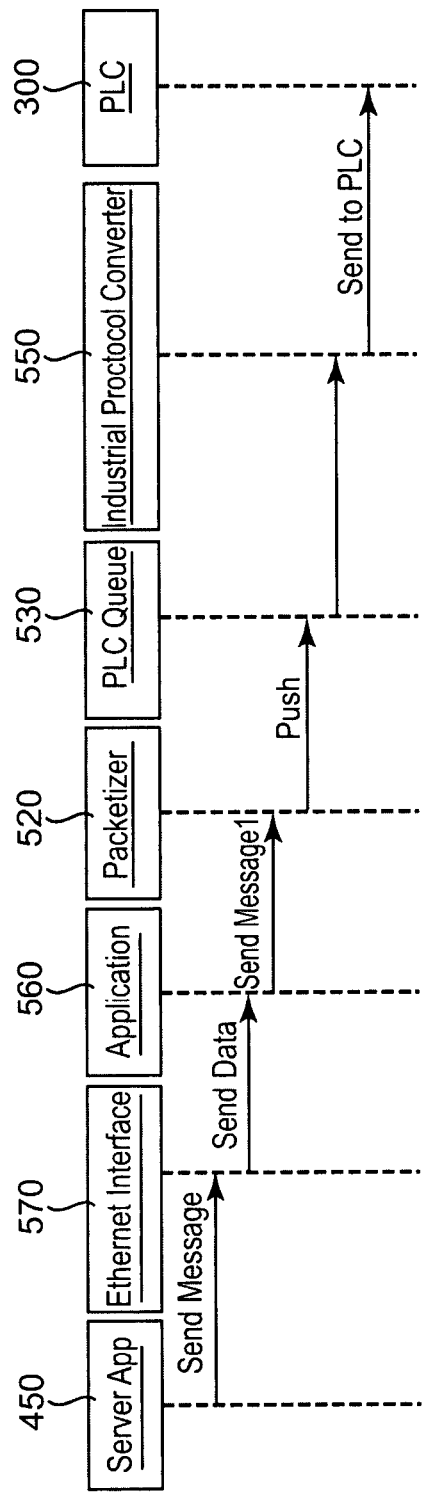
FIG. 5 is a diagram illustrating one embodiment of a process flow in a communication system according to the present invention.

FIG. 5 illustrates one embodiment of a process flow of data in communication system 100, including communication between an application on server 400 (FIGS. 1 and 2) and PLC 300 (FIGS. 1 and 2). In one embodiment, enterprise application 450 on server 400 sends a communication or message to PLC 300 by specifying PLC 300 as the destination. As such, the message is routed through application 560 via Ethernet interface 570 and to packetizer 520 as described above. The message is then routed to PLC 300 through PLC queue 530 and industrial protocol converter 550, in the manner described above. As such, enterprise application 450 on server 400 may communicate with PLC 300 by providing data to communication device 500 which in turn provides the data to PLC 300.

Figure 6:
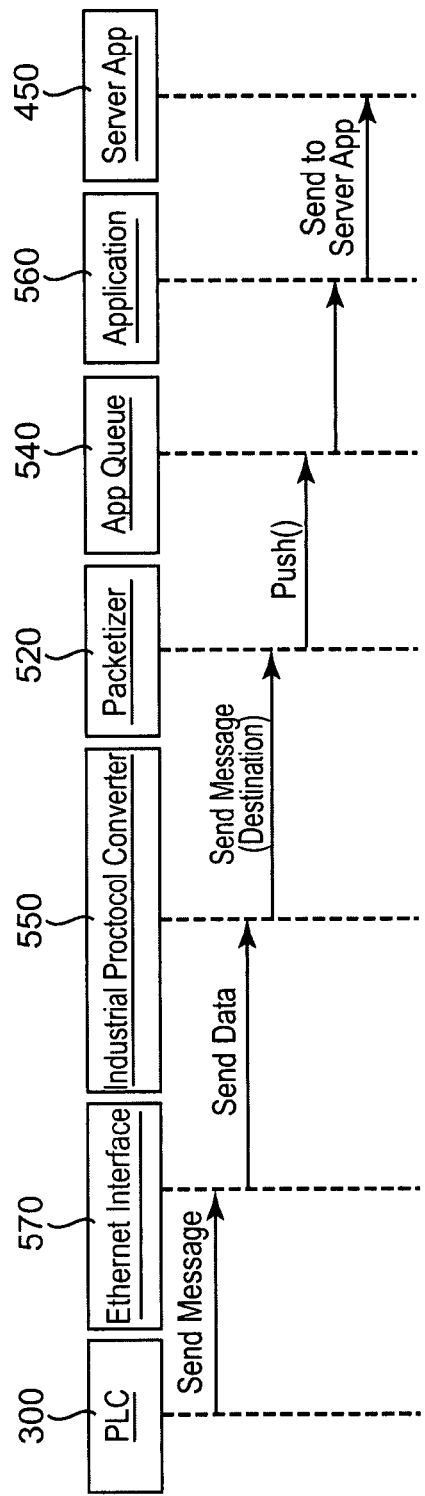
FIG. 6 is a diagram illustrating one embodiment of a process flow in a communication system according to the present invention.

FIG. 6 illustrates one embodiment of a process flow of data in communication system 100, including communication between PLC 300 (FIGS. 1 and 2) and an application on server 400 (FIGS. 1 and 2). In one embodiment, PLC 300 sends a communication or message to enterprise application 450 on server 400 by specifying enterprise application 450 as the destination. As such, the message is routed through industrial protocol converter 550 via Ethernet interface 570 and to packetizer 520 as described above. The message is then routed to enterprise application 450 through application queue 540 and embedded application 560, in the manner described above. As such, PLC 300 may communicate with enterprise application 450 on server 400 by providing data to communication device 500 which in turn provides the data to enterprise application 450.

Figure 7:
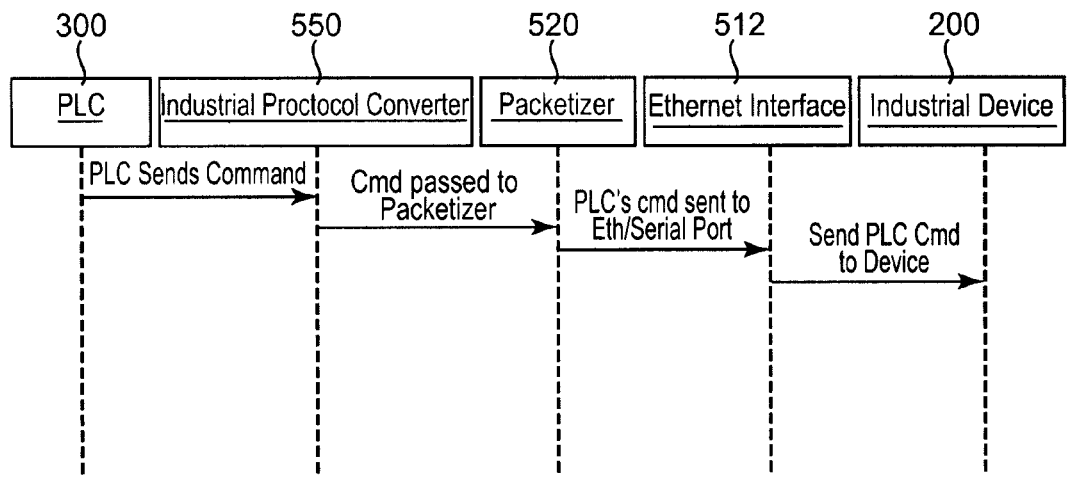
FIG. 7 is a diagram illustrating one embodiment of a process flow in a communication system according to the present invention.

FIG. 7 illustrates one embodiment of a process flow of data in communication system 100, including communication between PLC 300 (FIGS. 1 and 2) and industrial device 200 (FIGS. 1 and 2). In one embodiment, PLC 300 sends a communication or message to industrial device 200 by specifying industrial device 200 as the destination. As such, the message is routed through industrial protocol converter 550 and to packetizer 520 as described above. The message is then routed to industrial device 200 via Ethernet interface 512, in the manner described above. As such, PLC 300 may communicate with industrial device 200 by providing data to communication device 500 which in turn provides the data to industrial device 200.

Figure 8:
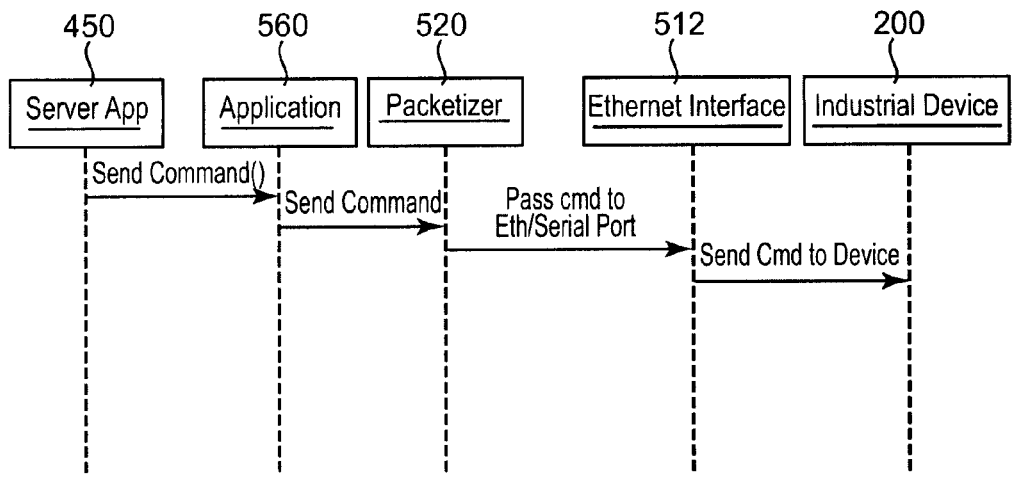
FIG. 8 is a diagram illustrating one embodiment of a process flow in a communication system according to the present invention.

FIG. 8 illustrates one embodiment of a process flow of data in communication system 100, including communication between an application on server 400 (FIGS. 1 and 2) and industrial device 200 (FIGS. 1 and 2). In one embodiment, enterprise application 450 on server 400 sends a communication or message to industrial device 200 by specifying industrial device 200 as the destination. As such, the message is routed through application 560 and to packetizer 520 as described above. The message is then routed to industrial device 200 via Ethernet interface 512, in the manner described above. As such, enterprise application 450 on server 400 may communicate with industrial device 200 by providing data to communication device 500 which in turn provides the data to industrial device 200. Although described above as originating with enterprise application 450 on server 400, FIG. 8 also illustrates one embodiment of a process flow of data between embedded application 560 of communication device 500 and industrial device 200 as originating with embedded application 560.

As described above, communication device 500 provides a platform for control, connectivity, and communication between industrial device 200 (e.g., weigh scale, barcode reader, RFID reader, vision system, sensor, etc.) and both a PLC 300 for industrial device 200 as well as an enterprise application 450 on server 400. As such, in one embodiment, communication device 500 communicates directly with industrial device 200, PLC 300, and enterprise application 450. Thus, communication device 500 receives data directly from industrial device 200 and communicates data from industrial device 200 directly to PLC 300 and enterprise application 450. In addition, communication device 500 receives instructions or commands for industrial device 200 directly from PLC 300 and enterprise application 450 and communicates the instructions or commands directly with industrial device 200.

By including communication device 500 in communication system 100, communication device 500 makes data retrieved from industrial device 200 available to multiple "clients" of that data (e.g., PLC 300 and enterprise application on server 400). In addition, in one embodiment, communication device 500 intelligently allows one client, all clients, less than all clients, or no clients to control industrial device 200 (e.g., industrial device 200 can be exposed in a read/write way to one client and exposed in a read only way to the other clients, or communication device 500 can allow some commands to come from one client and allow other commands to come from another client). In addition, in one embodiment, communication device 500 translates the data's formatting (i.e., protocol) into the client's protocol, and, in one embodiment, filters the data sent to each client (e.g., PLC 300 may only want a portion of the data, but the enterprise application on server 400 may need all of the data). In addition, in one embodiment, communication device 500 prioritizes the data sent to each client such that high priority data can be sent first and sent with priority flags to ensure more timely delivery.

By including communication device 500 in communication system 100 as described above, communication system 100 provides a system for sharing data from a field device with both a device controller (PLC) and an enterprise application, supports a method for providing information from a field device to an enterprise application without significantly impacting the PLC/field device relationship, and supports a method for providing feedback from an enterprise application to a PLC. In addition, by including communication device 500 in communication system 100 as described above, communication system 100 provides a distributed architecture which allows real-time decisions at the enterprise level. In addition, by replicating data received from a field device and providing separate filtering of the data for the PLC and the enterprise application after replicating, communication device 500 can support the particular needs of the PLC and the enterprise application for data from the field device. Furthermore, by including communication device 500 in communication system 100 as described above, an enterprise application may reside entirely on server 400, may reside on server 400 and have a distributed component on communication device 500 (i.e., application 560), or may reside entirely on communication device 500 (i.e., application 560).

Although communication system 100, including communication device 500, has been described as being applied to a manufacturing environment, communication system 100, including communication device 500, may be applied to other environments including industrial, building automation, retail, and transportation environments. As such, communication system 100, including communication device 500, facilitate real-time decisions, while integrating into existing controls infrastructures in those environments.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system for communicating between a field device, a device controller for the field device, and an enterprise application distinct from the device controller, the system comprising:
    a single communication device separate and distinct from the field device, the device controller, and the enterprise application, and configured to communicate with each of the field device, the device controller, and the enterprise application,
    wherein the single communication device is configured to be positioned in a communication path between the field device and the device controller, between the field device and the enterprise application, and between the device controller and the enterprise application,
    wherein, without interface of the field device with the device controller, without interface of the field device with the enterprise application, and without interface of the device controller with the enterprise application, the single communication device is configured to facilitate bi-directional communication between the field device and the device controller, facilitate bi-directional communication between the field device and the enterprise application and facilitate bi-directional communication between the device controller and the enterprise application,
    wherein the single communication device is configured to replicate data received from the field device and, after replication of the data, separately filter the data for the device controller and separately filter the data for the enterprise application,
    wherein the enterprise application produces a business event in response to data received from the field device and the business event is communicated to the device controller, which generates a control event to control the field device in response to the business event,
    wherein the enterprise application and the device controller comprise two of a plurality of clients which share control of the field device, and
    wherein the single communication device selectively allows commands for the field device based on an identity of the plurality of clients.

2. The system of claim 1, wherein, without interface of the field device with the device controller and without interface of the field device with the enterprise application, the single communication device is configured to facilitate communication from the field device to the device controller and to the enterprise application through the single communication device, and facilitate communication to the field device from the device controller and from the enterprise application through the single communication device.

3. The system of claim 1, wherein, without interface of the device controller with the enterprise application, the single communication device is configured to facilitate communication from the enterprise application to the device controller through the single communication device, and facilitate communication from the device controller to the enterprise application through the single communication device.

4. The system of claim 1, wherein the single communication device includes an embedded application, and wherein the embedded application is configured to at least one of filter the data from the field device for the enterprise application and analyze the data from the field device for the enterprise application.

5. The system of claim 1, wherein the single communication device includes an embedded application, and wherein the embedded application is configured to convert a format of the data from the field device to a format compatible with the enterprise application.

6. The system of claim 1, wherein the single communication device includes a protocol converter for the device controller, wherein the protocol converter is configured to convert a format of the data from the field device to a format compatible with the device controller.

7. The system of claim 6, wherein the protocol converter is configured to filter the data from the field device for the device controller.

8. The system of claim 1, wherein the field device comprises one of a sensor, a transmitter, and an actuator.

9. The system of claim 1, wherein the field device comprises one of a bar code scanner, a weigh scale, a radio frequency identification (RFID) reader, a vision sensor, a photo eye, a lidar, a printer, a display, a fare machine, a pressure sensor, and a temperature sensor.

10. The system of claim 1, wherein the device controller comprises a programmable logic controller (PLC).

11. The system of claim 1, wherein the enterprise application comprises one of an enterprise resource planning (ERP) system, a warehouse management system (WMS), a manufacturing execution system (MES), a business intelligence (BI) system, and a customer relationship management (CRM) system.

12. A method of communicating between a field device, a controller for the field device, and an enterprise application distinct from the controller for the field device, the method comprising:
    positioning a single communication device in a communication path between the field device and the controller for the field device, between the field device and the enterprise application, and between the controller for the field device and the enterprise application;
    establishing separate and independent communications between the single communication device and each of the field device, the controller for the field device, and the enterprise application, including, without direct connection between the field device and the controller for the field device, without direct connection between the field device and the enterprise application, and without direct connection between the controller for the field device and the enterprise application, bi-directionally communicating between the field device and the controller for the field device via the single communication device, bi-directionally communicating between the field device and the enterprise application via the single communication device, and bi-directionally communicating between the controller for the field device and the enterprise application via the single communication device;
    receiving data from the field device at the single communication device, replicating the data with the single communication device, and, after replicating the data, separately filtering the data for the controller for the field device and the enterprise application with the single communication device;
    wherein the enterprise application produces a business event in response to data received from the field device and the business event is communicated to the controller for the field device, which generates a control event for control of the field device in response to the business event;
    wherein the enterprise application and the controller for the field device comprise clients of a plurality of clients which share control of the field device; and
    wherein the single communication device selectively allows commands for the field device based on an identity of the plurality of clients.

13. The method of claim 12, wherein establishing separate and independent communications between the single communication device and each of the field device, the controller for the field device, and the enterprise application includes communicating from the field device to the controller for the field device and to the enterprise application through the single communication device, and communicating to the field device from the controller for the field device and from the enterprise application through the single communication device.

14. The method of claim 12, wherein establishing separate and independent communications between the single communication device and each of the field device, the controller for the field device, and the enterprise application includes communicating from the enterprise application to the controller for the field device through the single communication device, and communicating from the controller for the field device to the enterprise application through the single communication device.

15. The method of claim 12, further comprising:
    at least one of filtering the data from the field device for the enterprise application and analyzing the data from the field device for the enterprise application with an embedded application included in the single communication device and associated with the enterprise application.

16. The method of claim 12, further comprising:
    converting a format of the data from the field device to a format compatible with the enterprise application with an embedded application included in the single communication device and associated with the enterprise application.

17. The method of claim 12, wherein the single communication device includes a protocol converter, and further comprising:
    converting a format of the data from the field device to a format compatible with the controller for the field device with the protocol converter.

18. The method of claim 17, further comprising:
    filtering the data from the field device for the controller for the field device with the protocol converter.

19. The method of claim 12, wherein the field device comprises one of a sensor, a transmitter, and an actuator.

20. The method of claim 12, wherein the field device comprises one of a bar code scanner, a weigh scale, a radio frequency identification (RFID) reader, a vision sensor, a photo eye, a lidar, a printer, a display, a fare machine, a pressure sensor, and a temperature sensor.

21. The method of claim 12, wherein the controller for the field device comprises a programmable logic controller (PLC).

22. The method of claim 12, wherein the enterprise application comprises one of an enterprise resource planning (ERP) system, a warehouse management system (WMS), a manufacturing execution system (MES), a business intelligence (BI) system, and a customer relationship management (CRM) system.

23. A communication device for communicating between a field device, a device controller for the field device, and an enterprise application distinct from the device controller, the communication device comprising:
    a device interface configured to communicate with the field device, a controller interface configured to communicate with the device controller, and an application interface configured to communicate with the enterprise application, wherein the communication device is configured to be positioned in a communication path between the field device and the device controller, between the field device and the enterprise application, and between the device controller and the enterprise application, and, without direct interface between the field device and the device controller, without direct interface between the field device and the enterprise application, and without direct interface between the device controller and the enterprise application, the device interface and the controller interface are configured to facilitate bi-directional communication between the field device and the device controller through the communication device, the device interface and the application interface are configured to facilitate bi-directional communication between the field device and the enterprise application through the communication device, and the controller interface and the application interface are configured to facilitate bi-directional communication between the device controller and the enterprise application through the communication device;

a packetizer coupled to the device interface and configured to replicate data received from the field device for the device controller and the enterprise application;

a protocol converter configured to filter the data for the device controller after replication of the data by the packetizer and communicate the data with the device controller via the controller interface;

an embedded application configured to filter the data for the enterprise application after replication of the data by the packetizer and communicate the data with the enterprise application via the application interface;

wherein the enterprise application produces a business event in response to data received from the field device and the business event is communicated to the device controller, which generates a control event for control of the field device in response to the business event;

wherein the enterprise application and the device controller comprise clients of a plurality of different clients which share control of the field device through the single communication device; and wherein the single communication device allows different control of the field device for each of the plurality of different clients.

24. The communication device of claim 23, wherein the communication device is configured to facilitate bi-directional communication between the field device and each of the device controller and the enterprise application via the device interface, the controller interface, and the application interface without direct interface between the field device and the device controller and without direct interface between the field device and the enterprise application.

25. The communication device of claim 23, wherein the device interface and the application interface are configured to facilitate communication between the field device and the enterprise application independent of the controller interface.

26. The communication device of claim 23, wherein the protocol converter is configured to convert a format of the data from the field device to a format compatible with the device controller.

27. The communication device of claim 23, wherein the embedded application is associated with the enterprise application.

28. The communication device of claim 23, wherein the embedded application is configured to analyze the data from the field device for the enterprise application.

29. The communication device of claim 23, wherein the embedded application is configured to convert a format of the data from the field device to a format compatible with the enterprise application.

30. The communication device of claim 23, wherein the device interface comprises at least one of a serial interface and an Ethernet interface, and wherein the controller interface and the application interface comprises at least one of a serial interface and an Ethernet interface.

31. The communication device of claim 23, wherein the field device comprises one of a sensor, a transmitter, and an actuator.

32. The communication device of claim 23, wherein the field device comprises one of a bar code scanner, a weigh scale, a radio frequency identification (RFID) reader, a vision sensor, a photo eye, a lidar, a printer, a display, a fare machine, a pressure sensor, and a temperature sensor.

33. The communication device of claim 23, wherein the device controller comprises a programmable logic controller (PLC).

34. The communication device of claim 23, wherein the enterprise application comprises one of an enterprise resource planning (ERP) system, a warehouse management system (WMS), a manufacturing execution system (MES), a business intelligence (BI) system, and a customer relationship management (CRM) system.

35. The system of claim 1, wherein the single communication device is configured to facilitate simultaneous communication between the field device and the device controller and between the field device and the enterprise application.

36. The method of claim 12, wherein establishing separate and independent communications between the single communication device and each of the field device, the controller for the field device, and the enterprise application includes communicating between the field device and the controller for the field device simultaneous with communicating between the field device and the enterprise application.

37. The communication device of claim 23, wherein the communication device is configured to facilitate simultaneous communication between the field device and the device controller and between the field device and the enterprise application.

* * * * *